A. BAILEY.
RODENT EXTERMINATOR.
APPLICATION FILED DEC. 23, 1912.
1,080,529.
Patented Dec. 9, 1913.
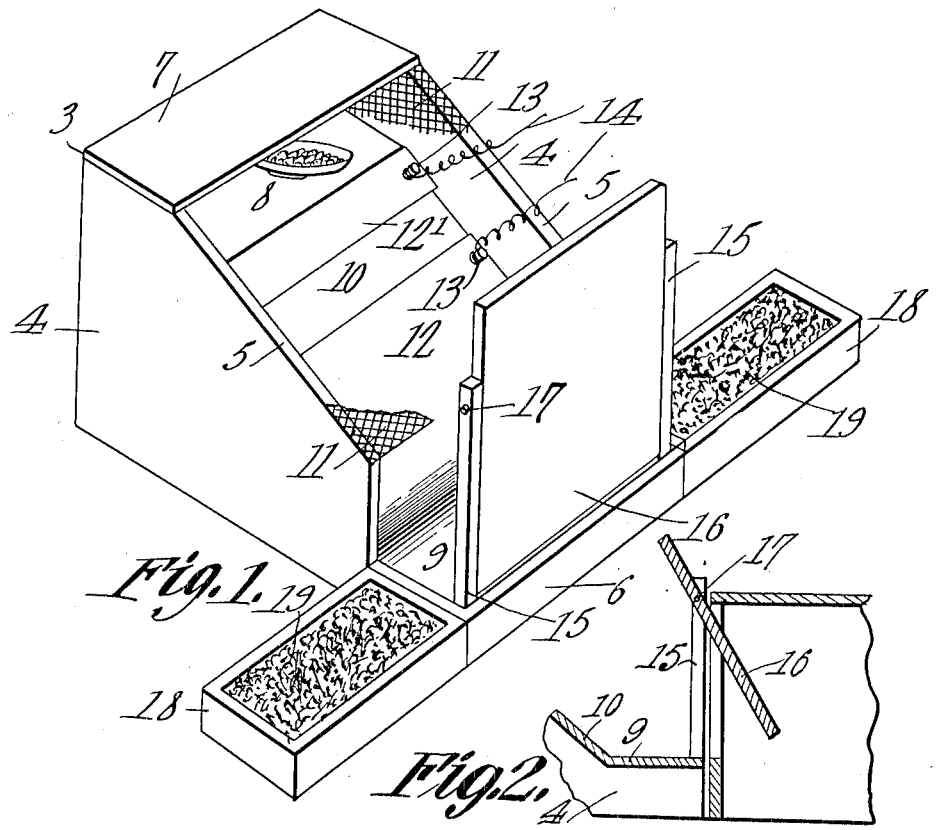
Witnesses
Asa Bailey,
Inventor

UNITED STATES PATENT OFFICE.

ASA BAILEY, OF NORTH VERNON, INDIANA.

RODENT-EXTERMINATOR.

1,080,529.   Specification of Letters Patent.   Patented Dec. 9, 1913.

Application filed December 23, 1912. Serial No. 738,335.

*To all whom it may concern:*

Be it known that I, ASA BAILEY, a citizen of the United States, residing at North Vernon, in the county of Jennings and State of Indiana, have invented a new and useful Rodent-Exterminator, of which the following is a specification.

The present invention relates to a rodent exterminator or trap, and more particularly to a device of that character which is adapted to electrocute rats or rodents.

It is the object of the present invention to provide a trap or exterminator of the character indicated which shall be of novel and improved construction, and which shall combine simplicity, compactness and cheapness of structure, with efficiency and serviceability.

As another object, the present invention contemplates the provision of a platform over which the rodents are lured by suitable bait disposed at the farther end thereof, in connection with electrodes secured on the platform or runway adapted to be connected to a suitable source of electric current so as to electrocute the rodents bridging them during their passage over the platform.

Another object of the present invention is to provide in connection with the means for electrocuting the rodents, a means whereby the electrocuted rodents may be discharged into a box or other container, where they will be hidden from view, especially from the view of the other rodents in the act of entering the trap.

Among its other objects, this invention aims to provide means for wetting or moistening the feet of the rodents as they enter the trap in order to insure of proper electrical connection with the electrodes; to provide means for excluding larger animals from the trap or to otherwise prevent other objects from contacting with the electrodes; and to otherwise generally improve the construction and utility of devices of that character to which the present invention relates.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Referring specifically to the drawings wherein two preferred embodiments of the present invention have been illustrated, Figure 1 is a perspective view of one form, parts being broken away. Fig. 2 is a sectional detail.

Referring specifically to the drawings, and particularly to Fig. 1, the structure disclosed therein, comprises a casing or frame 3 embodying the sides 4, which are cut diagonally or obliquely between their top and front edges, as at 5, and which are provided with the lower extension 6 at their forward ends. The top 7 is secured on the sides 4, and a shelf 8 is secured between the sides below the top 7, while a platform 9 is secured within the extension 6. An inclined runway 10 is secured between the sides 4 and connects the shelf 8 and platform 9. A reticulated panel 11 of wire mesh or the like is secured on the diagonal edges 5 of the sides 4, and together with the top 7 provides a suitable covering to prevent the rodents from entering the bait compartment between the shelf 8 and top 7 from a direction other than upwardly along the runway 10 from its lower end. The covering also prevents small objects from falling into the trap, as well as obviating the possibility of other or larger animals from accidentally entering the trap. The reticulated panel 11 exposes the bait, which is disposed on the shelf 8, and permits the bait as well as the runway to be sufficiently lighted from the exterior.

In order to electrocute the rodents as they pass up the runway 10 toward the bait, a pair of electrodes 12 and 12', preferably in the form of suitable sheet metal plates, are secured in a spaced relation on the runway 10, in order that the rodents in climbing upward or during their ascent will bridge the electrodes so as to close an electrical circuit, the terminals of which are secured to the respective plates. These electrodes are provided with binding posts 13 to which are connected the respective terminals 14 of an electrical circuit of any suitable character, preferably an alternating, interrupted, or varying current producing the proper pulsation for effectively electrocuting the rodents. These electrodes are preferably secured adjacent the lower and upper ends of the runway, and may be suitably roughened to prevent slipping and to insure the proper electrical contact of the feet of the animals therewith, or if desired, the electrodes may be fashioned from zinc, or other metal or alloy which does not present a smooth or slippery surface.

In order to dispose of the rodents as they are electrocuted, it being noted that the runway is inclined, and that when the rodents are electrocuted, they will roll or gravitate down the runway, a trap door is mounted at the lower end of the runway through which the dead rodents may be discharged into a box or any suitable container (see Fig. 2). In order to carry this into effect, a standard or upright 15 is secured to each corner of the extension 6 or the platform 9, and a door 16 is hinged adjacent its upper end, as at 17, to the respective standards 15 so that its free or lower end is suspended over the edge of the platform 9. This door 16 is necessarily pivoted so as to swing freely or readily and the platform 9 is of such dimensions that the rats or rodents rolling or sliding down the runway after they have been electrocuted, may readily pass over the platform and under the door 16 to a box or container. After the dead rats have been discharged under the door 16, the door will return to normal position and will hide from view, the rats accumulating in the box, and especially to prevent those rodents about to enter the trap from viewing the electrocuted rats. The standards 15 and the door 16 also close the forward end of the trap, and leaves two passages or openings at the sides between the sides 4 and the standards 15, through which the rodents may enter the trap.

Suitable trays or receptacles 18 are disposed at each side of the extension 6, or at the threshold of the entrance openings and are adapted to contain sawdust 19 or the like and in addition thereto a quantity of water so that the rodents in entering the trap, are constrained to pass over the sawdust. Thus, the feet of the rodents are moistened or dampened to insure of an electrical connection with the electrodes 12 and 12' when the rodents bridge the same.

From the foregoing, taken in connection with the drawing, it will be evident that the rats may readily enter the trap so as to pass onto the platform 9, and from thence may crawl upward on the runway 10 toward the bait, it being preferable to supply a generous amount of bait so as to most effectively lure the rodents. As the rodents pass up the runway 10, they will first encounter the electrode 12, and before reaching the bait, will bridge the space or gap between the two electrodes, and in this event, will close the electrical circuit resulting in their electrocution. The dead or electrocuted rodents, will roll or slide down the runway across the platform 9 and under the door 16 to the proper container. The device is comparatively simple, there being no moving parts except the door 16, and it will be noted that the objects aimed at have been carried out satisfactorily.

What is claimed as new is:—

1. In a rodent exterminator, an inclined runway, spaced electrodes thereon, a bait holder at the upper end of the runway, and a trap door hinged adjacent its upper end with its lower end suspended at the lower end of the runway, and providing entrance openings between the sides of the runway and the edges of the door leading to the lower end of the runway.

2. In a rodent exterminator, a casing including sides, an inclined runway secured therebetween, a platform secured to the lower end of the runway at the front of the sides, a bait holder arranged at the upper end of the runway, a trap door suspended over the edge of the platform, and providing entrance openings between the sides and door leading to the platform and spaced electrodes secured on the runway.

3. A rodent exterminator, including a casing having sides, an inclined runway secured between the sides, a platform secured to the lower end of the runway at the front of the sides, a bait holder arranged at the upper end of the runway, spaced electrodes secured on the runway, standards arranged at the corners of the platform, and a door hinged between the standards, so as to provide entrance openings between the standards and the sides leading to the platform.

4. In a rodent exterminator, a casing including sides, an inclined runway secured therebetween, a bait shelf secured between the sides at the upper end of the runway, a covering secured on the sides, spaced electrodes secured on the runway, and a trap door mounted at the lower end of the runway, and providing entrance openings between the door and sides leading to the lower end of the runway.

5. In a rodent exterminator, a casing including sides, and having a lower extension at its forward end, an inclined runway secured between the sides, a bait shelf secured between the sides at the upper end of the runway, a pair of spaced electrodes secured on the runway, a platform secured to the extension at the lower end of the runway, a covering mounted on the sides, and a trap door suspended over the edge of the platform, and providing entrance openings between the door and sides leading to the platform.

6. In a rodent exterminator, a casing including sides, and having a lower extension at its forward end, an inclined runway secured between the sides, the sides having diagonal edges above and parallel with the runway, a top secured on the sides, a shelf secured between the sides below the top and at the upper end of the runway, a reticulated panel secured on the diagonal edges, spaced electrodes secured on the runway, a platform secured to the extension at the lower end of the runway, standards secured to the corners of the platform, and a door hinged between the standards, so as to provide entrance openings between the standards and sides leading to the platform.

In testimony that I claim the foregoing as my own, I have hereto affixed my signature in the presence of two witnesses.

ASA BAILEY.

Witnesses:
M. A. WELLS,
M. T. LINDLEY.